Aug. 20, 1940.                L. A. FRY                 2,212,066
METHOD AND APPARATUS FOR RECOVERING VALUABLE CONSTITUENTS FROM CITRUS FRUIT
              Filed Jan. 2, 1937         9 Sheets-Sheet 4
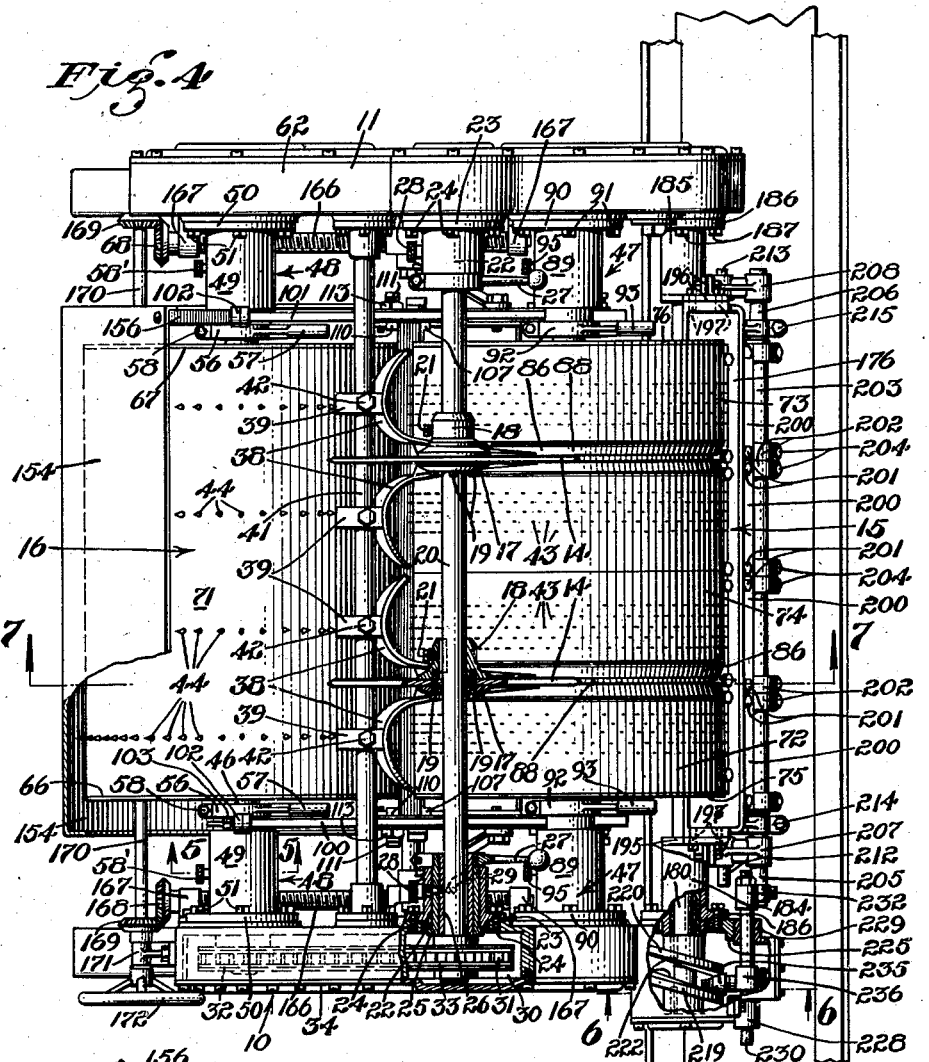
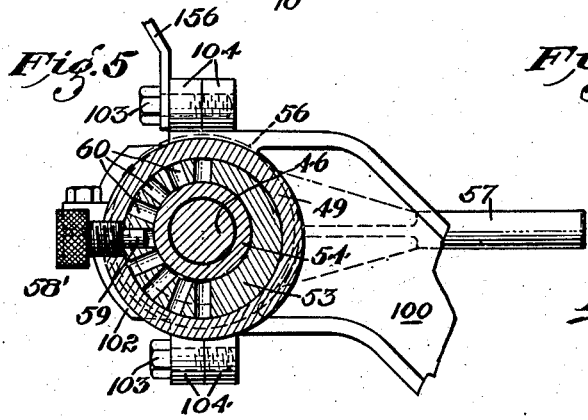
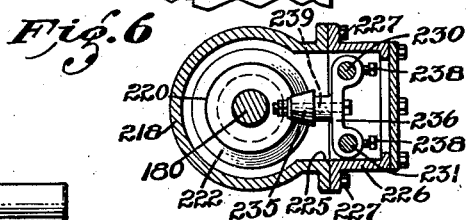
INVENTOR
Lawrence A. Fry
By
ATTORNEY.

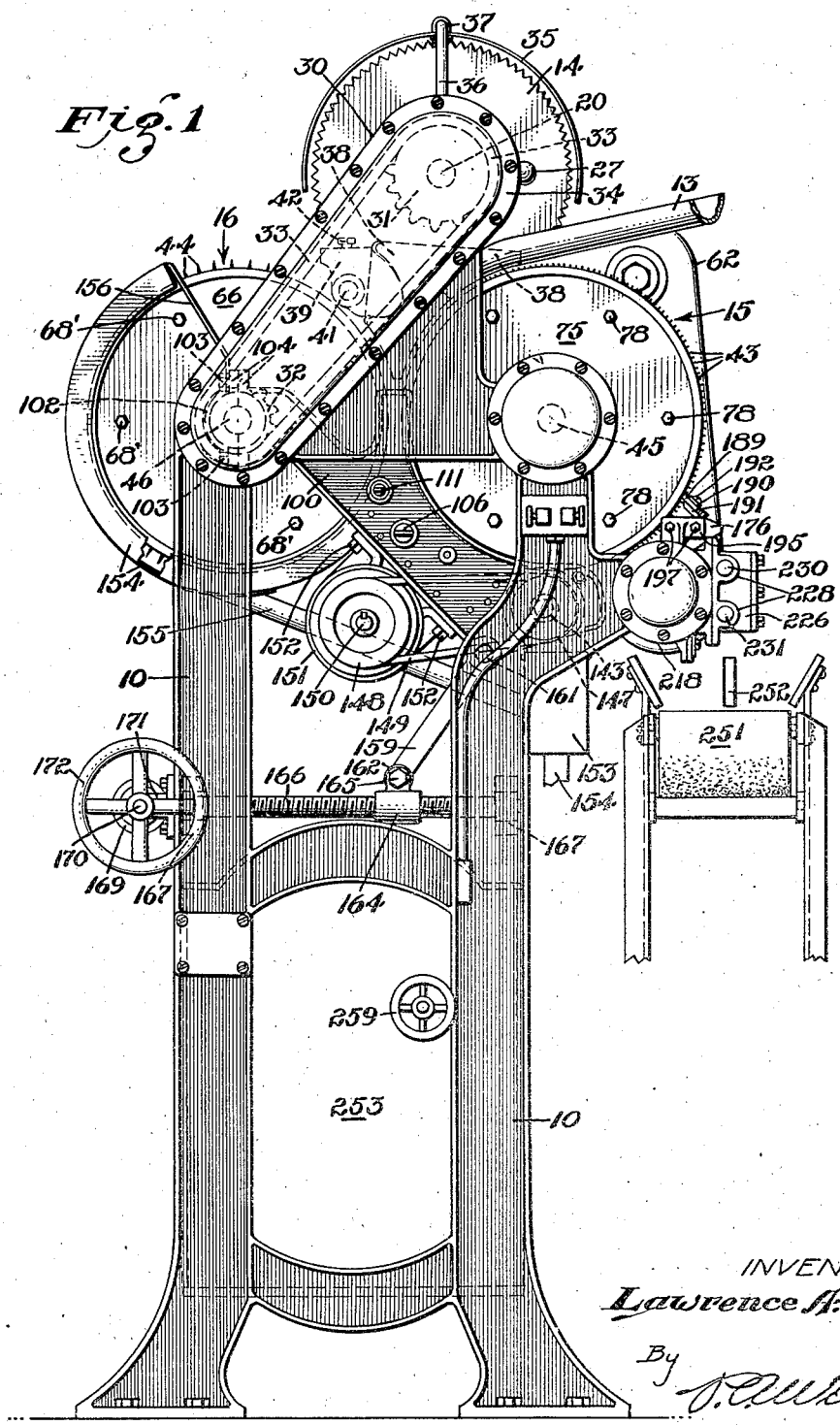

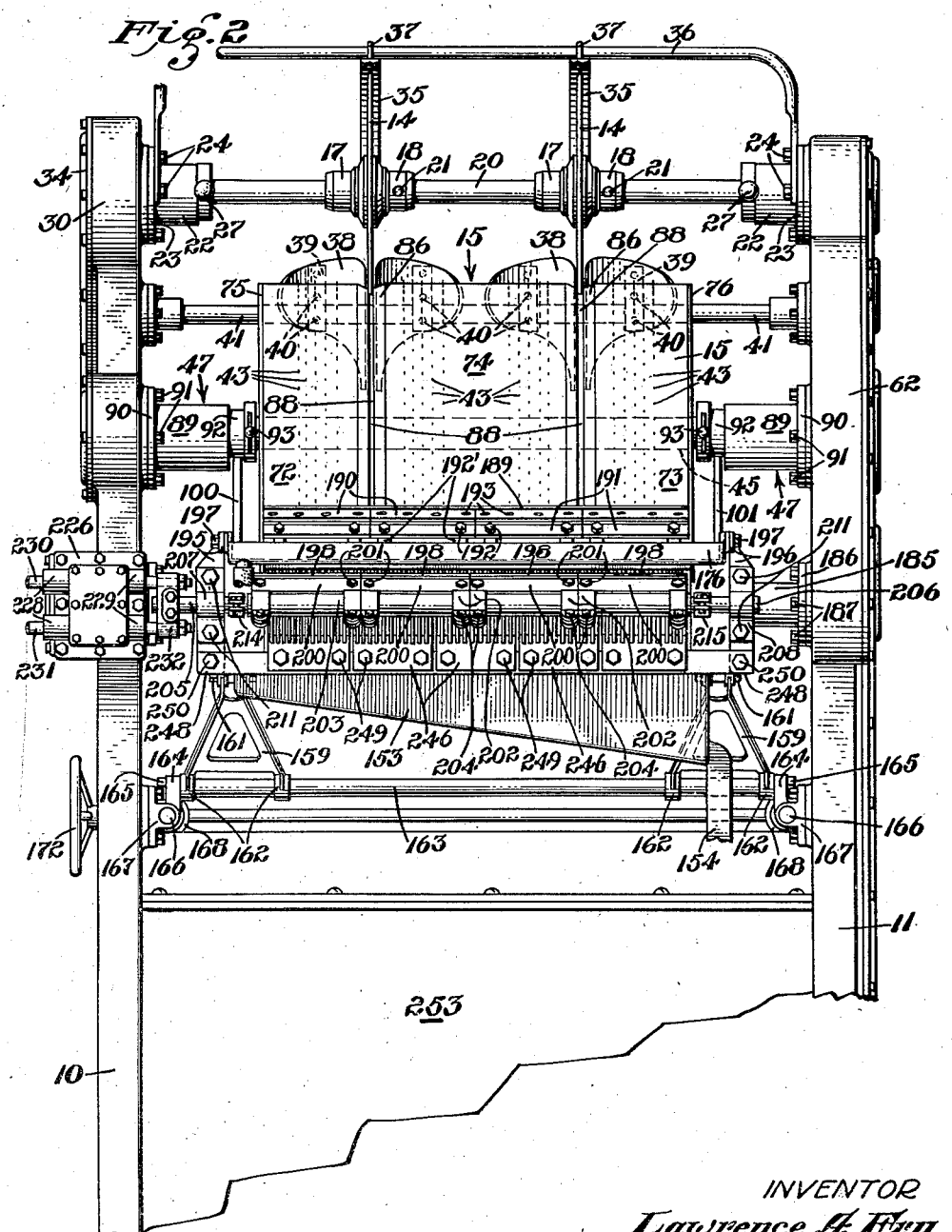

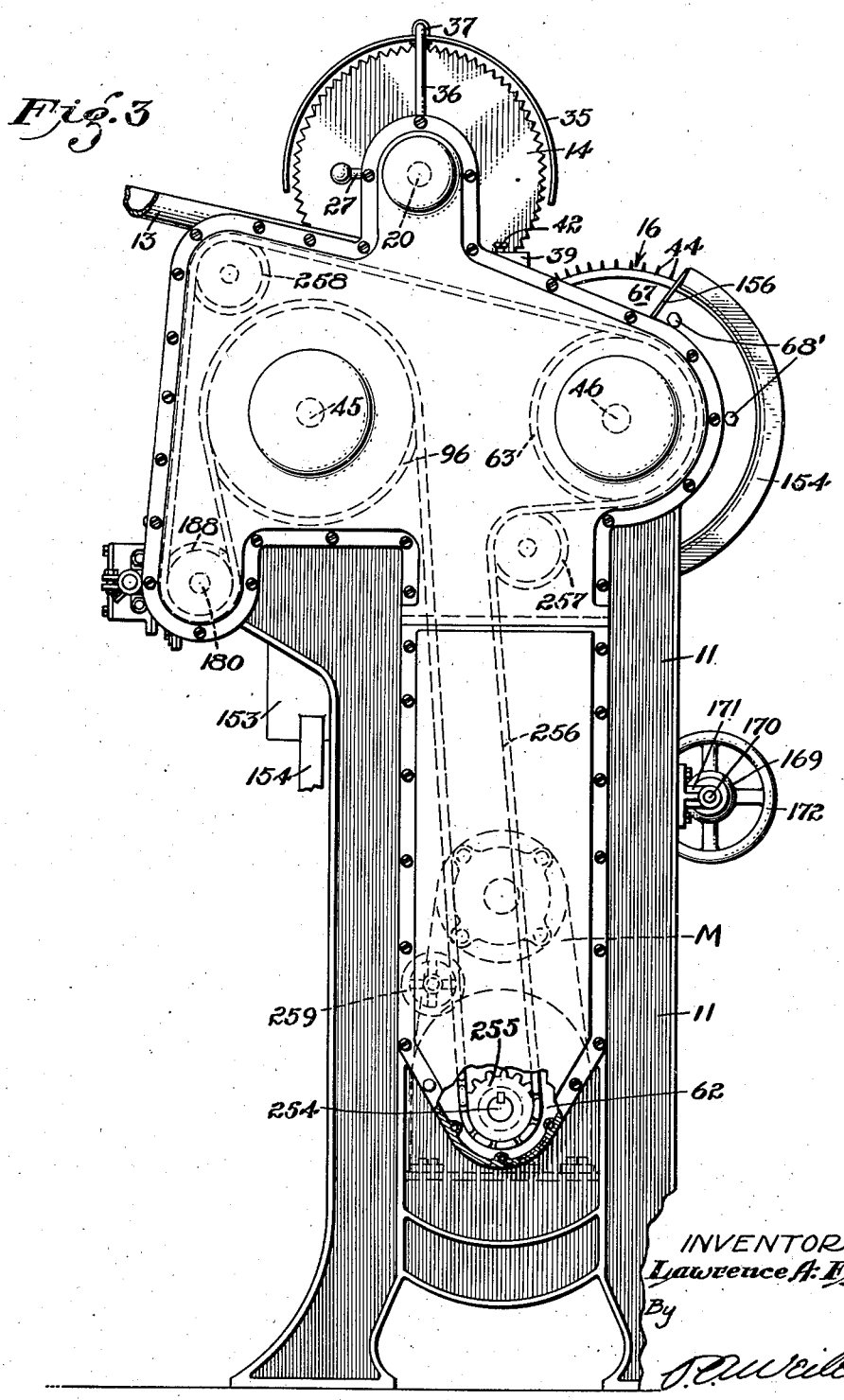

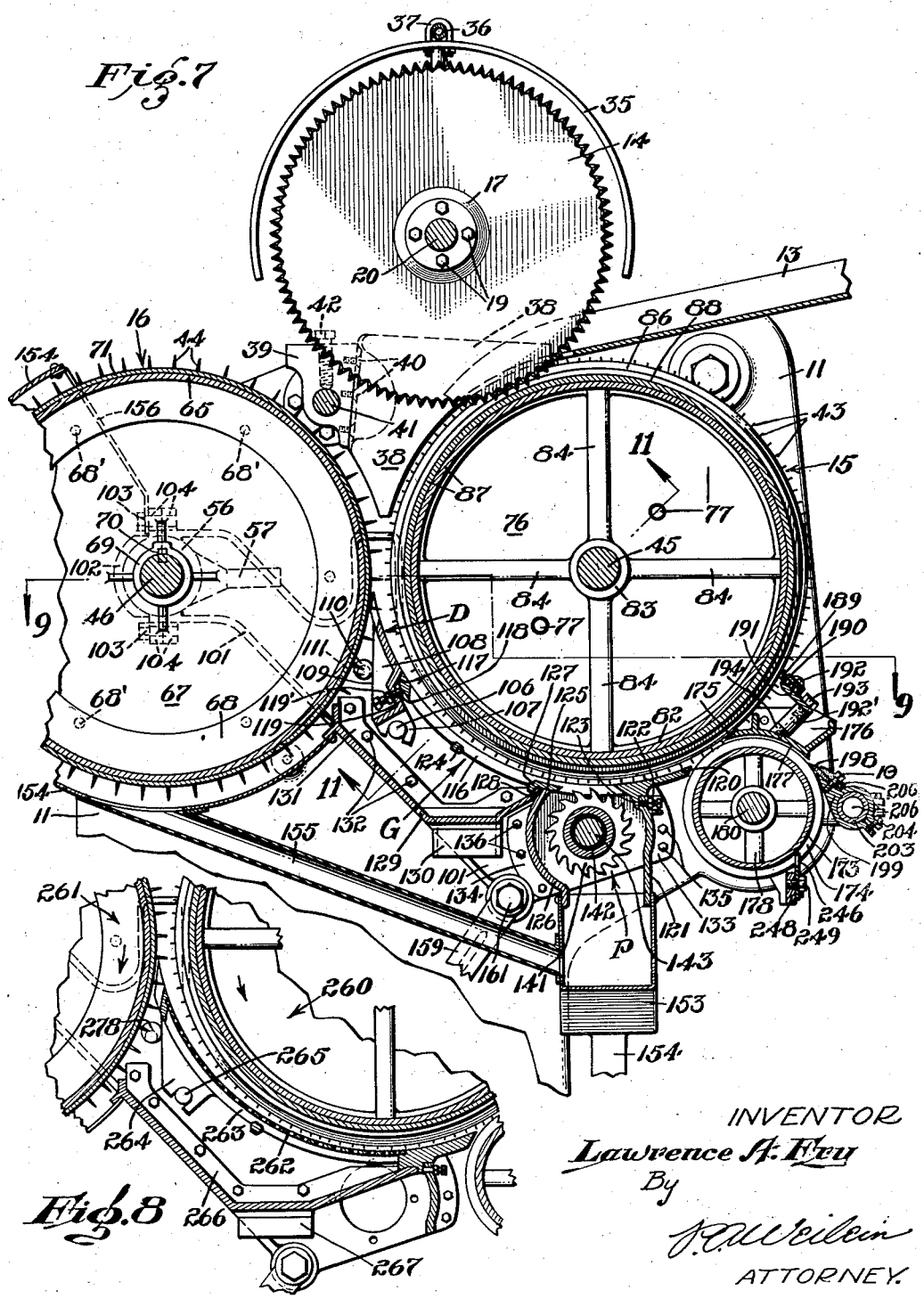

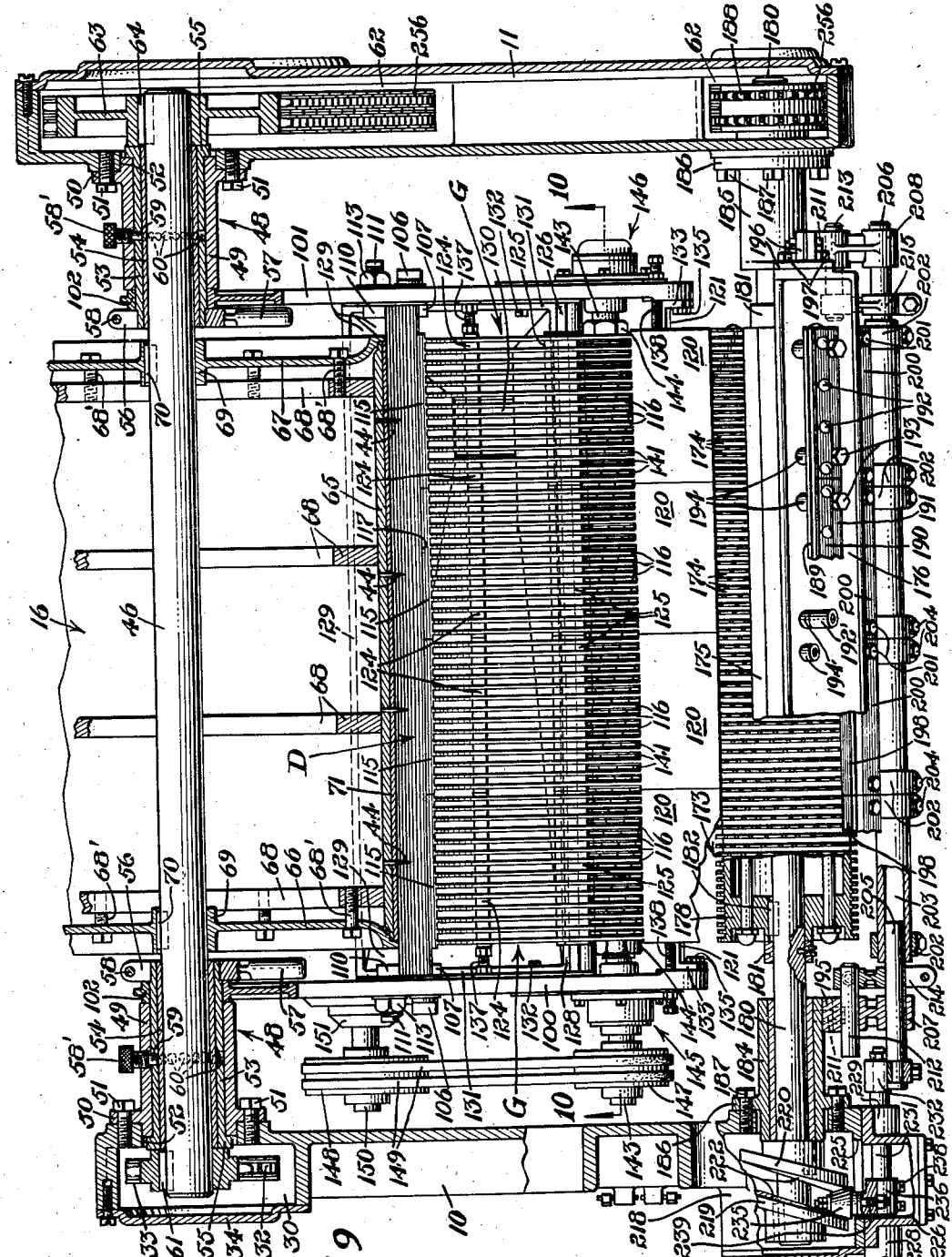

Aug. 20, 1940.   L. A. FRY   2,212,066
METHOD AND APPARATUS FOR RECOVERING VALUABLE CONSTITUENTS FROM CITRUS FRUIT
Filed Jan. 2, 1937   9 Sheets-Sheet 7

INVENTOR
Lawrence A. Fry
By
J. C. Weilein
ATTORNEY.

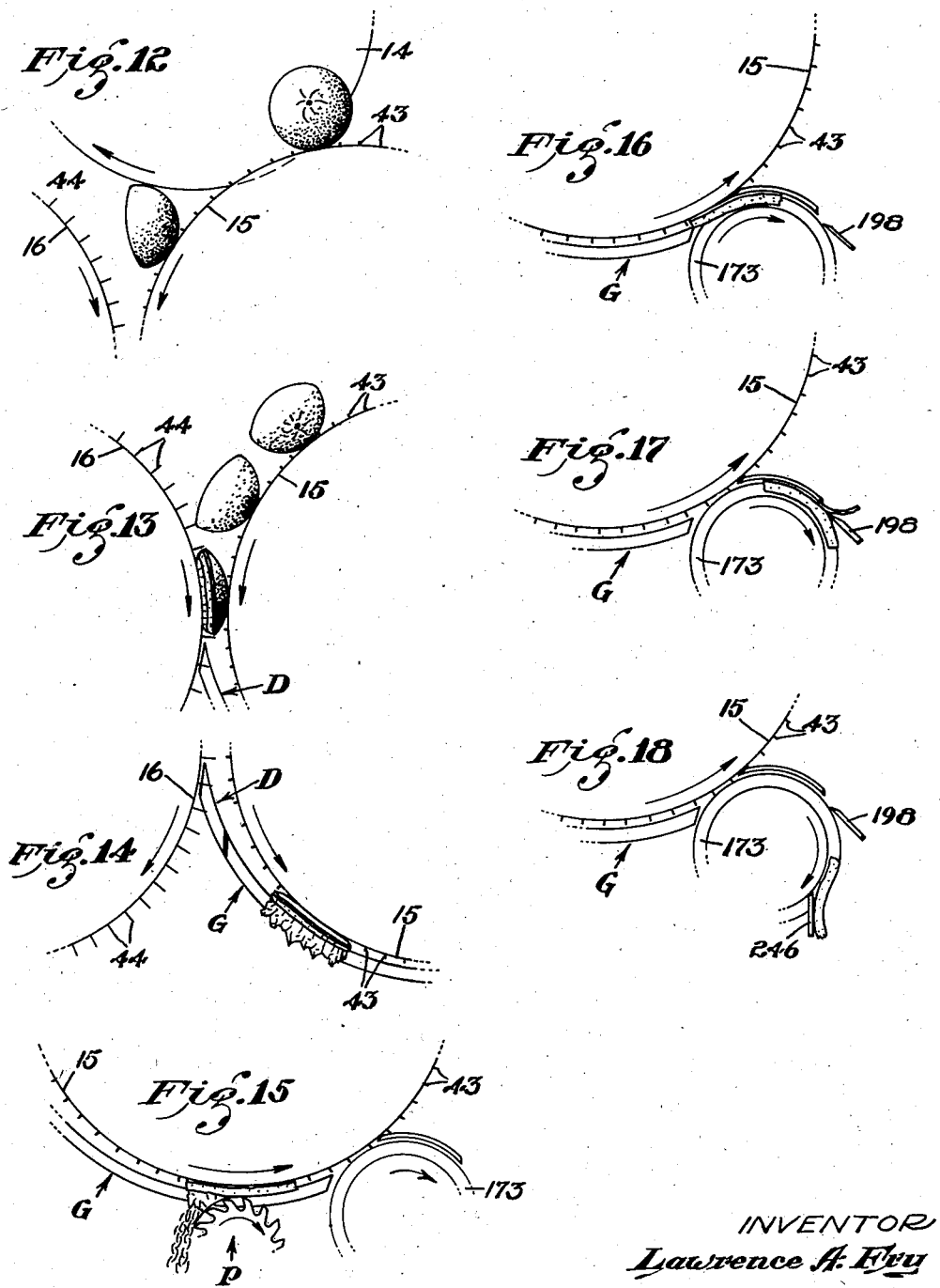

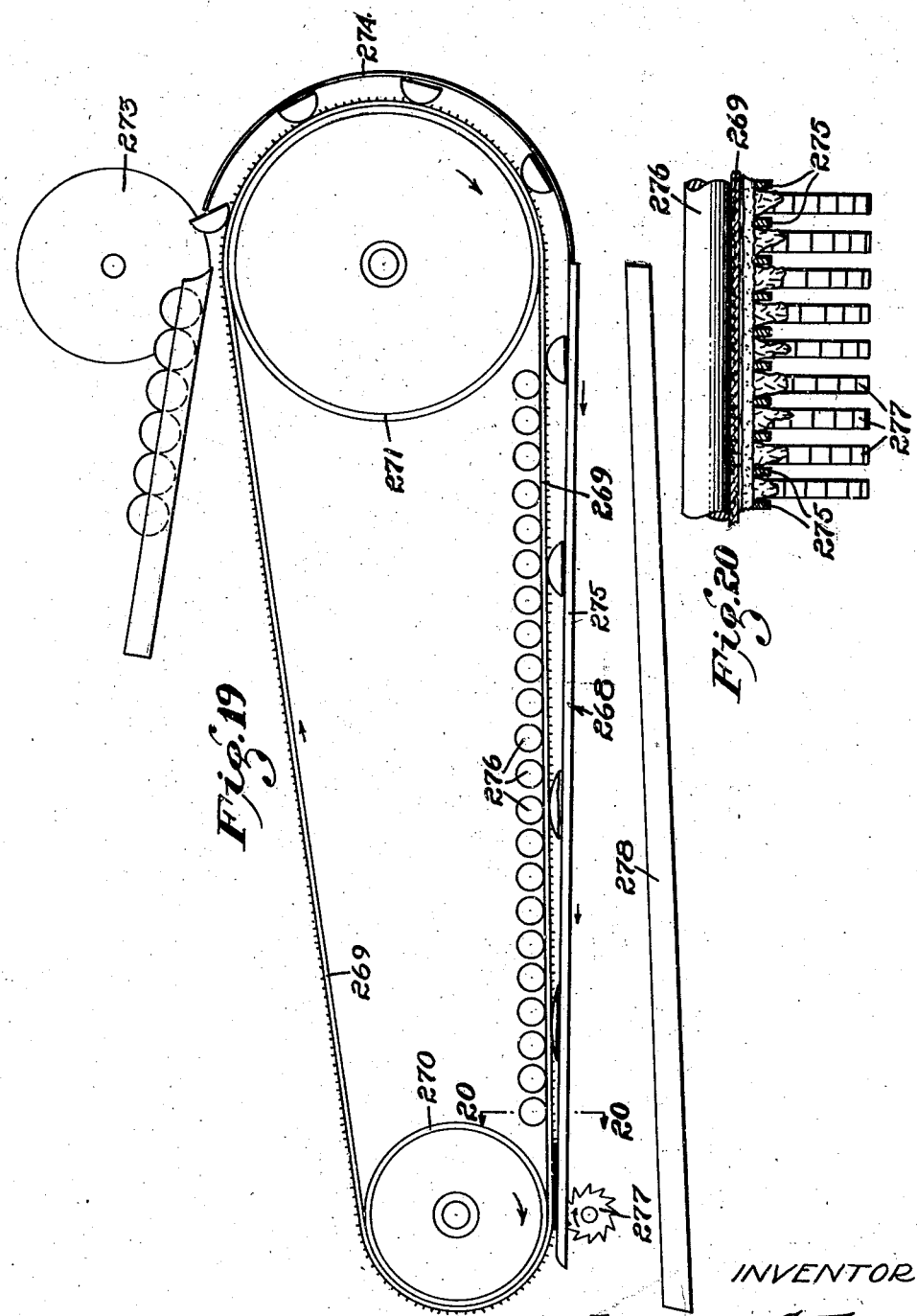

Patented Aug. 20, 1940

2,212,066

UNITED STATES PATENT OFFICE 2,212,066

METHOD AND APPARATUS FOR RECOVERING VALUABLE CONSTITUENTS FROM CITRUS FRUIT

Lawrence A. Fry, Los Angeles, Calif., assignor to Bireley's Incorporated, Los Angeles, Calif., a corporation of California Application January 2, 1937, Serial No. 118,907

20 Claims. (Cl. 146—3)

This invention relates to a process and an apparatus for recovering valuable constituents from citrus fruit, such as oranges, grape fruit, lemons, tangerines, limes and the like, and when throughout the specification and claims I refer to citrus fruit it will be understood that I refer to fruits of the family *Rutaceae* or genus Citrus which does not include pineapples.

The constituents of certain species of citrus fruit are valuable if properly derived. For instance the juice or combined juice and pulp from oranges and grape fruit is healthful and delicious as a drink if unmixed with the oils contained in the rind of the fruit. These oils in an isolated state are valuable for producing flavor extracts, and the oil bearing rind is commonly marketed in the form of candied rind. It is also employed in the manufacture of marmalade. The white lining adjacent the outer oil bearing rind contains pectin which is employed in jellifying juices.

There are numerous machines for recovering the juice and pulp from citrus fruit. However, these machines provide a series of reamers for removing the juice bearing pulp, and the capacity of said machines is limited by the number of reamers employed. There are also machines which remove the outer oil bearing rind from the fruit prior to squeezing the same for extracting the juice, the purpose being to prevent the contamination of the juice by the rind oils. The capacity of these machines is also limited by the number of devices employed for holding the fruit as it is being acted upon.

It is an object of the present invention to provide an apparatus for recovering valuable constituents from citrus fruit, in which sections of fruit are moved continuously in a given path as the operations for deriving the constituents are performed thereon.

It is another object of the invention to provide an apparatus of the character referred to in which the sections of fruit are moved continuously in a given path by contact with its outer oil bearing rind.

It is a further object of the invention to provide an apparatus of the character referred to in which the sections of fruit are moved continuously in an arcuate path as the operations are performed thereon for deriving the constituents.

Another object of the invention is the provision of an apparatus of the character referred to in which the sections of fruit are conveyed through a tapered passage and gradually compressed, whereby to extract the juice therefrom.

Another object of the invention is the provision of an apparatus of the character described in which the sections of fruit are fed into a tapered passage and moved therethrough by contact with its oil bearing rind, whereby to gradually compress the fruit during the course of its movement.

It is another object of the invention to provide an apparatus for recovering valuable constituents from citrus fruit in which sections of the fruit are moved over a grid structure by contact with the oil bearing rind thereof and the juice bearing pulp of said fruit forced into said grid structure and severed from the rind.

Another object of the invention is the provision of means for separating the inner pectin bearing lining of the fruit from the outer oil bearing rind.

A further object of the invention resides in the method of accomplishing this separation which consists of impressing the pectin bearing lining of the fruit into a grooved surface, and severing the oil bearing rind extending above the surface from the embedded material.

It is a further object of the invention to provide an apparatus for recovering valuable constituents from citrus fruit, in which the fruit is severed into sections and fed between a revoluble drum and another member positioned in convergent spaced relation to the periphery of said drum, said sections of fruit being conveyed over said converging member by the engagement of its oil bearing rind with the drum, whereby to gradually compress the fruit during its movement.

It is still another object of the invention to provide an apparatus for recovering valuable constituents from citrus fruit in which the fruit is severed into sections which are fed between a revoluble drum and a grid structure arranged in convergent spaced relation with the periphery of the drum, said fruit being conveyed over said grid by the engagement of its oil bearing rind with said drum, whereby to force the juice bearing pulp of the fruit into the grid structure.

It is another object of the invention to provide an apparatus of the character referred to in which the grid structure is adjustable with respect to the revoluble drum.

A further object of the invention is the provision of an apparatus of the character referred to in which the fruit is moved over a severing mechanism which removes the juice bearing pulp extending into the grid structure from the pectin bearing lining.

Another object of the invention is the provision of an apparatus of the character referred to in which the oil liberated from the oil bearing rind during the pulp exposing and severing operations is sealed between the oil bearing rind and the conveying member against which it bears, whereby to restrain said oil from contaminating the juice and pulp.

Another object of the invention is the provision of an apparatus for recovering valuable constituents from citrus fruit in which sections of the fruit are fed between a pair of revoluble rollers and conveyed over a pressure applying member by the engagement of its oil bearing rind with one of said rollers, said pressure applying member being curved and disposed in convergent spaced relation to the periphery of the conveying drum, whereby to effect a compression of the fruit during the course of its movement.

A further object of the invention is the provision of an apparatus of the character referred to in which means is provided on one of the revoluble drums for ensuring the movement of the fruit onto the pressure applying member with its severed surface adjacent the same.

Another object of the invention is to provide an apparatus of the character referred to in which the space between the revoluble rollers for receiving the fruit may be varied for accommodating fruit of different sizes.

Still another object of the invention is the provision of an apparatus of the nature described in which means is provided for severing the fruit into halves and directing the severed sections between the revoluble rollers so that the oil bearing rind portion of the fruit is engaged by the conveying drum.

Another object of the invention resides in a method of recovering the juice and pulp from citrus fruit which consists of dividing the fruit into sections, of compressing the juice bearing pulp of the fruit into a grid structure, and of subjecting the embedded pulp to the action of a severing device.

A further object of the invention is the provision of an apparatus for recovering valuable constituents from citrus fruit, which may be easily cleaned and in a minimum period of time.

Another object of the invention is to provide an apparatus for recovering valuable constituents from citrus fruit, which will accommodate more fruit per unit of time and effect a more perfect separation of the constituents than machines heretofore devised.

A still further object of the invention is the provision of an apparatus of the character referred to in which the various component parts of the citrus fruit are derived with a minimum of waste and without contaminating one part with another.

This invention possesses many other advantages and has other objects which will be made more easily apparent from a consideration of the embodiments thereof shown in the accompanying drawings and forming part of the present specification. I shall now proceed to describe these forms in detail which illustrate the general principles of my invention; but it should be understood that this description is not to be taken in a limiting sense, since the scope of my invention is best defined in the appended claims.

In the drawings:

Figure 1 is an elevational view showing one side of my improved apparatus for recovering the valuable constituents from citrus fruit and the like.

Figure 2 is a front elevation of the apparatus with the lower portion of the supporting structure being shown broken away.

Figure 3 is an elevation of the opposite side of the apparatus from that shown in Figure 1.

Figure 4 is a top plan view, showing portions broken away for clarifying certain structures.

Figure 5 is an enlarged sectional view taken as indicated by line 5—5 of Figure 4.

Figure 6 is an enlarged sectional view taken as indicated by line 6—6 of Figure 4.

Figure 7 is an enlarged vertical sectional view through the upper portion of the apparatus, taken as indicated by line 7—7 of Figure 4.

Figure 8 is a fragmentary sectional view showing a modified form of my invention.

Figure 9 is a horizontal sectional view taken as indicated by line 9—9 of Figure 7, the front drum being removed and certain portions being broken away for the purpose of clarification.

Figure 10:
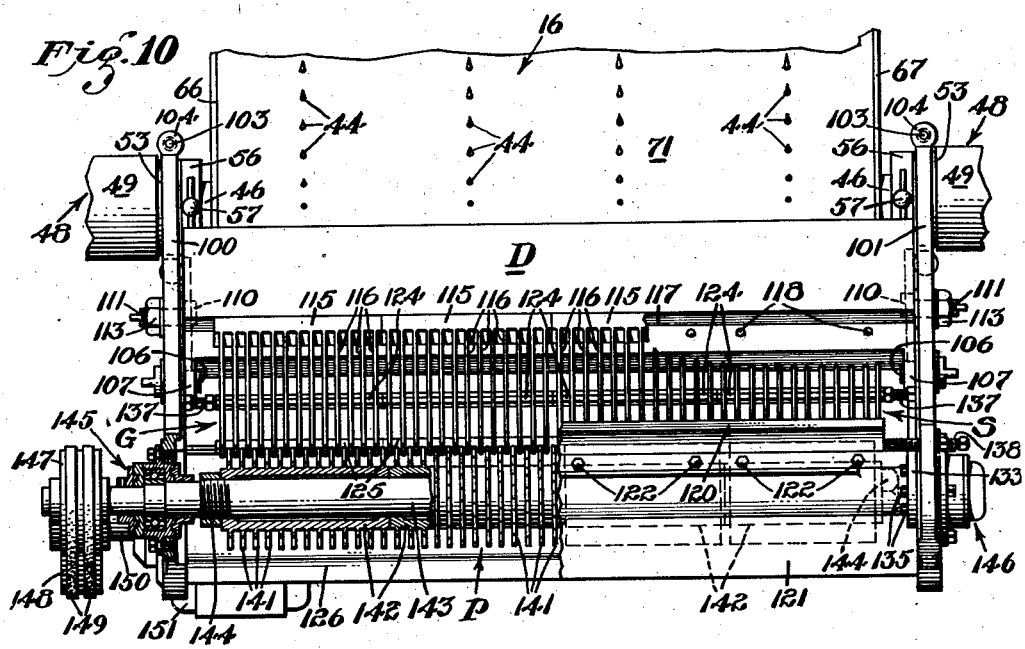
Figure 10 is a sectional view taken as indicated by line 10—10 of Figure 9.

Figures 12 to 18 inclusive are diagrammatic views illustrating the various operations performed upon the fruit for deriving the valuable constituents therefrom.

Figure 19 is a modified form of my invention for recovering valuable constituents from citrus fruit, and Figure 20 is a sectional view taken as indicated by line 20—20 of Figure 19.

In the form of my apparatus which will first be described, the fruit is severed into halves which are directed between a pair of revoluble rollers or drums and initially compressed. The fruit is then directed onto a grid structure with its severed surfaces facing the same, and is conveyed over the grid structure by contact of its oil bearing rind with one of the revoluble drums. The grid structure is curved to conform substantially to the peripheral contour of the conveying drum, and is convergently spaced therefrom so that the fruit is gradually compressed and its juice bearing pulp forced into the grid structure. The embedded juice bearing pulp is subjected to the action of a severing device and is thereby removed from the inner pectin bearing lining of the fruit. The combined inner pectin bearing lining together with the outer oil bearing rind is then transferred onto a separating device which effects a separation of the inner pectin bearing lining and the outer oil bearing rind. In this form of my invention the fruit is moved continuously in an arcuate path as the operations are performed thereon. The compression action upon the fruit during its movement over the grid structure causes the liberation of oil from the outer oil bearing rind. The tight engagement of the rind with the contacting surface of the revoluble conveying drum serves to seal the oil and prevent it from entering the juice and pulp derived from the fruit. This sealing action constitutes a salient feature of the invention. Upon disengagement of the rind from the revoluble conveying drum, the liberated oil adheres to the surface of the conveying drum and is carried to a point where it is removed for uses which are well known.

The mechanism provided for deriving the various constituents from the fruit is supported between a pair of spaced supporting pedestals 10 and 11. The fruit may be fed into the apparatus by any suitable conveying means. For instance, in Figures 1, 3, and 7, I have shown troughs 13 through which the fruit is fed by gravity into engagement with a pair of rotary serrated knives 14, which sever the fruit into halves prior to its entrance between the revoluble drums 15 and 16. The knives are held between a pair of clamping members 17 and 18 as by screws 19, (Figures 2, 4, and 7), and the assemblies are fixedly mounted on a revoluble shaft 20 as by the aid of set screws 21 carried by the clamping members 18.

The opposite ends of the shaft 20 are journaled in bearing structures mounted on the inner sides of the supporting pedestals 10 and 11 as shown clearest in Figure 4. These bearing structures comprise outer bearing housings 22 provided with exterior annular flanges 23, by which they are secured to the supporting pedestals 10 and 11 as by the aid of screws 24. Since the construction of these bearing structures and the means for mounting the same upon the supporting pedestals are similar, only one is shown in detail. The housings 22 contain adjustable eccentric members 25, embodying bushings 26, which provide bearings for the shaft 20. Operating handles 27 are clamped onto the eccentric members 25 for effecting an adjustment thereof as by rotating the same with respect to the bearing housings 22. It will be obvious how the shaft 20 with its accompanying knives 14 may readily be adjusted toward and away from the front drum 15 through the rotary adjustment of the eccentric members 25. The eccentric members may be retained in various positions of adjustment by thumb screws 28, which are threaded through the bearing housings 22, and are provided with reduced ends adapted for entrance into radially disposed openings 29 provided in the eccentric members 25. One end of the shaft 20 extends through its bearing support into a housing 30 provided by the supporting pedestal 10 and carries a sprocket 31. This sprocket 31 is driven from a sprocket 32, carried on the supporting shaft of the rear drum 16, through the chain 33. The various members for driving the rotary knives 14 are enclosed in the housing 30, and a removable closure plate 34 is provided for rendering the members accessible from the exterior of the supporting pedestal 10. The rotary knives 14 are shielded by guards 35, which are mounted on a supporting bar 36 by U-bolts 37. The supporting bar is secured to the flanges 23 of the bearing housings 22 by the screws 24, which also serve to secure the bearing housings 22 to the bearing pedestals 10 and 11, all of which is shown clearest in Figure 2.

Upon being severed by the rotary knives 14, the halved fruit is directed between the rotary drums 15 and 16 so that its severed surfaces face the rear drum 16. This is accomplished by guide members 38, shown clearest in Figures 2, 4, and 7. The forward ends of these guide members are positioned adjacent the opposed surfaces of the rotary knives, slightly behind their forward cutting edges. The guide members 38 are curved outwardly from the sides of the rotary knives 14 and extend downwardly between the drums 15 and 16 to a point somewhat above that position where the drums are nearest together. They are secured to members 39 by screws 40, and the members 39 are in turn adjustably mounted on a rod 41, which also serves as a brace between the supporting pedestals 10 and 11. Set screws 42 serve to secure the members 39 in place on the rod 41.

The diagrammatic Figures 12 and 13 illustrate the fruit in the process of being severed into halves and guided between the revoluble drums 15 and 16. After being severed by the rotary knives 14, the halved fruit is carried downwardly by the engagement of the revoluble drum 15 with its oil bearing rind. During the downward movement of the fruit the guide members 38 act upon the same to turn its severed surfaces toward the rear drum 16. The positions assumed by the halved fruit during its movement between the rotary drums 15 and 16 is illustrated in the diagrammatic view Figure 13. A series of pins 43 are arranged around the periphery of the front drum 15 opposite the downwardly extending portions of the guide members 38. The engagement of these pins with the oil bearing rind facilitates in conveying the fruit between the revoluble drums as the guide members 38 act upon the fruit to direct its severed surfaces toward the rear drum 16.

The forward or leading edges of the fruit have a tendency to turn upwardly upon leaving the guide members 38, which is objectionable for reasons which will hereinafter be apparent. This undesirable effect is obviated by rotating the rear drum 16 faster than the forward drum 15. Furthermore, a row of spikes 44 is provided around the periphery of the drum 16 opposite each series of pins 43 carried on the drum 15. These spikes strike the forward edges of the fruit forcing the same downwardly into proper position for entrance between the revoluble drums, as shown clearest in Figure 13. Furthermore, the spikes 44 slit the forward edges of the fruit, thereby preventing the leading edges of the fruit from turning under during the initial compressing operation between the revoluble drums.

The drums 15 and 16 are fixedly mounted on shafts 45 and 46 respectively, which are supported in bearing structures 47 and 48 mounted on the supporting pedestals 10 and 11. The bearing structures 48 for supporting the rear drum shaft 46 include bearing housings 49, having exterior annular flanges 50 by which the bearing structures are secured to the supporting pedestals through the screws 51. Figures 5 and 9 show the interior construction of the bearing structures 48, which are similar to the bearing structures 47 not shown in detail. One end of the bearing housings 49 enters openings 52 provided in the supporting pedestals 10 and 11. Adjustable eccentric members 53 are contained in the bearing housings 49 and carry bushings 54 which provide bearings for the ends of the drum shaft 46. The eccentric members are provided at one end with annular outwardly extending flanges 55, which bear against those ends of the bearing housings extending into the openings 52 in the supporting pedestals 10 and 11. The opposite ends of the eccentric members extend beyond the innermost ends of the bearing housings 49 and are shouldered to receive split clamping rings 56 formed on the operating handles 57. The clamping rings 56 are secured in clamped relation on the eccentric members 53 as by the bolts 58. The eccentric members 53 are shown in their mean position (Figure 5), and it will be obvious how the shaft 46 together with the drum 16 may be adjusted toward or away from the front drum 15 by rotating the eccentric members 53 in opposite directions through the operating handles 57. The purpose of adjustably supporting the rear drum 16 with respect to the front drum 15 is to make possible the accommodation of fruit of different sizes between the revoluble drums, and it will be obvious how this adjustment may be accomplished without in any way discontinuing the operation of the apparatus. Thumb screws 58' are employed for retaining the eccentric members 53 in their adjusted positions. The screws 58' are threaded through the bearing housings 49 as shown clearest in Figure 9 and are provided with reduced ends 59 which are adapted for entrance into the radially disposed openings 60 provided in the eccentric members 53.

One end of the shaft 46 extends through its bearing support into the housing 30 provided in the supporting pedestal 10, and carries the sprocket 33 which is splined thereto by a key 61. The knife shaft 20 carries the sprocket 31 (Figures 1 and 4), and is driven from the shaft 46 through the chain 32 interconnecting the sprockets 31 and 33, all of which has heretofore been described. The opposite end of the drum shaft 46 extends through its bearing support into a housing 62 provided in the supporting pedestal 11, and carries a sprocket 63 which is splined to the shaft end by a key 64 (Figures 3 and 9). The sprocket 63 forms part of a common driving arrangement which will hereinafter be fully described.

Figures 7 and 9 best show the construction of the rear drum 16, which includes a cylinder 65 supported between a pair of end members 66 and 67. A number of supporting rings 68 are provided within the cylinder 65 for strengthening the same, and said rings may be welded or otherwise suitably secured to the inner surface of the cylinder. The end members 66 and 67 are secured to two of these supporting rings as by screws 68', which extend through the drum ends and are threaded into the rings as shown clearest in Figure 9. Said end members serve to support the drum 16 on the shaft 46. They are provided with central hubs 69 through which the shaft 46 extends, and said hubs are splined to the shaft as by the keys 70. A liner 71 is provided on the outer periphery of the cylinder 65 and is formed of material which is not appreciably affected by the acids common to citrus fruit. The spikes 44 are provided with shank portions which extend through the liner 71 and cylinder 65 of the drum 16 as shown in Figure 9. The spikes are arranged in spaced rows around the periphery of the drum 16 and the pointed ends extending from the drum, act upon the fruit in a manner heretofore clearly described.

Figure 11:
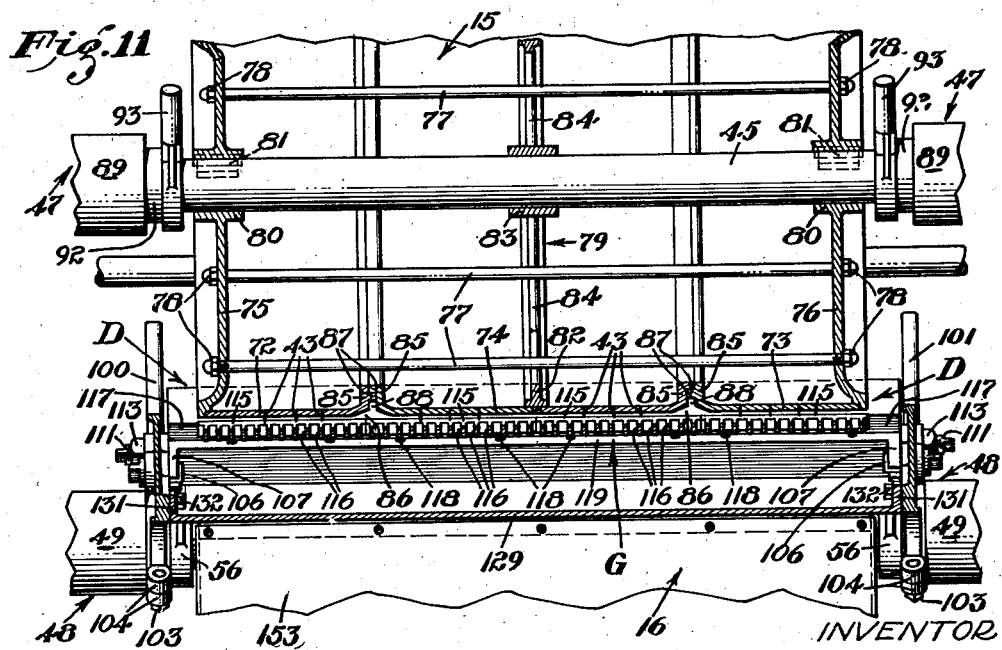
Figure 11 is a section taken as indicated by line 11—11 of Figure 7.

The construction of the front drum 15 is best illustrated in Figures 7 and 11. It comprises cylindrical end sections 72 and 73, a cylindrical center section 74, and ends 75 and 76 between which said sections are clamped as by the tie rods 77, which carry nuts 78 on their threaded extremities. The drum ends 75 and 76 together with a central supporting structure 79, serve to support the drum 15 on the shaft 45. The drum ends are provided with central hubs 80 through which the shaft 45 extends, and keys 81 serve to spline said hubs to the shaft. The central supporting structure 79 embodies a rim 82 and a central hub 83 through which the supporting shaft 45 extends. The rim may be welded or otherwise suitably connected to the interior of the central cylindrical section 74 and it is connected to the hub by a plurality of spokes 84. The adjacent ends of the cylindrical drum sections 72, 73, and 74 are provided with inwardly extending annular flanges 85, and are beveled to form a pair of V-shaped grooves 86 around the periphery of the drum. The adjacent flanged ends of the drum sections are provided with annular, axially extending, interfitting flanges 87 by which they are slightly separated to form the annular grooves 88 at the bottom of the V-shaped grooves 86. The grooves 88 are disposed opposite the rotary severing knives 14, which are adapted to enter the same during the operation of the machine. The rotary knives may be adjusted with respect to the annular grooves 88 through the adjustment of the eccentric bearing structures within which the ends of the knife shaft 20 are supported, in a manner heretofore described. The V-shaped grooves 86 are adapted to receive the fruit and guide the same into engagement with the rotary knives 14. They also serve to restrain the severed halves of the fruit from falling outwardly prior to their engagement with the guide members 38.

The shaft 45 for supporting the front drum 15 is journaled in the bearing structures 47 heretofore referred to. These bearing structures are similar to the bearing structures 48 which support the shaft 46. They comprise outer housings 89 provided with flanges 90 by which said housings are secured to the supporting pedestals 10 and 11 as by the screws 91. The bearing housings 89 contain eccentric sleeves 92 within which the ends of the shaft 45 are revolubly supported. These eccentric sleeves are similar to those shown in connection with the bearing structures 48, and may be similarly adjusted as by the operating handles 93, for adjusting the drum 15 with respect to a device for separating the pectin bearing material of the fruit from the oil bearing rind, all of which will hereinafter be fully described. The eccentric sleeves 92 may be secured in various positions of adjustment by thumb screws 95 (Figure 4). These screws are threaded through the housings 89 and engage openings in the eccentric sleeves 92, all of which is not shown in detail, since the construction is similar to that shown in connection with the bearing structures 48 (Figure 9). One end of the shaft 45 extends through its bearing support 47 into the housing 62 provided in the supporting pedestal 11, and carries a sprocket 96 (Figure 3). Said sprocket forms part of a common driving arrangement hereinafter described.

After the sections of fruit have been initially compressed between the rotary drums 15 and 16, they are deflected from engagement with the rear drum 16 by a deflector D. The engagement of the front drum 15 with the oil bearing rind carries the fruit downwardly over a grid structure G. The grid structure conforms substantially to the peripheral contour of the front drum 15, but is convergently spaced relative thereto. Accordingly, the juice bearing pulp of the fruit is forced into the grid structure as the fruit is gradually compressed between the grid structure and the drum 15 during its downward movement therebetween. The exposed juice bearing pulp is subjected to the action of a pulp severing device generally designated P, which causes a removal of the juice bearing pulp from the rind of the fruit.

The deflector D, grid structure G, and pulp severing device P are all supported between a pair of supporting arms 100 and 101. The upper ends of the supporting arms 100 and 101 are pivotally supported on the eccentric members 53 of the bearing structures 48. The upper ends of said arms 100 and 101 are constructed to partially surround the eccentric members 53, and they are held thereon by bearing caps 102. The bearing caps are secured to the arm ends by screws 103, which extend through corresponding lugs 104 provided on the bearing caps 102 and arm ends respectively. Obviously, any adjustment of the rear drum 16 with respect to the front drum 15 will result in a corresponding movement of the upper ends of the supporting arms 100 and 101.

The deflector D extends entirely across the face of the rear drum 16 and is pivotally supported at opposite ends by lugs 106. The lugs 106 are threaded through the supporting arms and extend inwardly therefrom to receive yokes 107 formed on the opposite ends of the deflector D. End portions 108 are also formed on the deflector as shown clearest in Figure 7. The rearward edges 109 of the end portions 108 bear against eccentrics 110 carried on the inner ends of adjusting screws 111. These adjusting screws extend through the supporting arms 100 and 101 and are provided with flattened portions on their outer extremities by which the eccentrics 110 may be rotated for adjusting the upper edge of the deflector D with respect to the surface of the rear drum 16. Lock nuts 113 are provided on threaded ends of the adjusting screws for locking the eccentrics 110 in their adjusted positions.

The grid structure G comprises a plurality of similar curved sections 115, each consisting of a series of bars 116 arranged in spaced parallel relation. The upper ends of the grid sections 115 abut against a shoulder 117 provided on the deflector D, and are supported by a plurality of adjusting screws 118, threaded through a portion 119 formed on the deflector, all of which is shown clearest in Figures 7, 9, and 11. The adjusting screws 118 provide means for maintaining the grid sections in alignment with the independently adjustable deflector D, and said adjusting screws are provided with lock nuts 119' for securing them in their adjusted positions. The lower ends of the grid sections 115 are provided with solid extended portions 120. Said extended portions are supported on the upper edge of a member 121 which forms one side of a housing for the pulp severing device P hereinafter described in detail. The upper ends of the grid sections 115 are maintained in abutment with the shouldered portion 117 of the deflector D by the adjusting screws 122 (Figures 7 and 10). The screws 122 are threaded through the housing member 121 and bear against the downwardly extending flanges 123 formed on the extended portions 120 of the grid sections 115. The grid sections 115 are provided with transverse reenforcing ribs 124 and 125. The ribs 125 bear against the upper edge of a member 126, which forms the other side of the housing for the pulp severing device P. Said ribs 125 are formed with flanges 127 which extend downwardly over the lower edge 128 of a juice collecting hopper 129 having an outlet 130. The ends of the hopper 129 are provided with flanged portions 131 which are secured to the supporting arms 100 and 101 as by the screws 132. The housing sides 121 and 126 for enclosing the pulp severing device P are also provided with flanged ends 133 and 134 respectively, which are secured to the supporting arms 100 and 101 by screws 135 and 136. The grid sections 115 are retained in clamped relation by screws 137 and 138 carried by the supporting arms 100 and 101. The screws 137 are threaded into the supporting arms 100 and 101 as shown clearest in Figures 9 and 10. The heads of said screws bear against the ends of the reinforcing ribs 124 of the outermost grid sections 115, for clamping the upper ends of the grid section together. The screws 138 serve to clamp the lower ends of the grid sections together. They are threaded through the ends of the arms 100 and 101 and bear against the ends of the solid extended portions 120 of the outermost grid sections 115. Obviously the grid sections can be maintained in perfect alignment through the adjustment of the screws 137 and 138.

The pulp severing device P is best shown in Figures 7, 9 and 10. It comprises a plurality of spaced rotary cutters 141, the cutting edges of which extend between the spaced parallel bars 116 of the grid section 115. The cutters 141 are formed on a number of sleeves 142, which are in turn fixedly mounted on a revoluble shaft 143 as by keys or the like (not shown). The sleeves 142 are held in clamped relation between a pair of retaining nuts 144 which are threaded onto the ends of the shaft 143. The shaft ends are supported in well known bearing structures such as 145 and 146, which are mounted on the lower ends of the supporting arms 100 and 101 respectively. That end of the shaft 143 supported by the bearing structure 145, extends through said bearing structure and carries a double V-belt pulley 147. Said pulley is connected to a driving pulley 148 through a pair of V-belts 149. The driving pulley is in turn carried on the drive shaft 150 of a motor 151, which is mounted on the underside of the juice collecting hopper 129 as by the bolts 152 (Figure 1). The driving motor 151 may be connected with any suitable electrical source (not shown).

After the fruit has been initially compressed between the revoluble drums 15 and 16, it is deflected by the deflector D onto the grid sections 115, with its severed surfaces adjacent said grid sections. The action of the grid sections upon the fruit as it is moved thereover is best illustrated in the diagrammatic view, Figure 14. Due to the convergent relationship between the grid sections 115 and the periphery of the drum 15, it will be obvious how the fruit will gradually be compressed as it is conveyed by the engagement of its oil bearing rind with the drum 15 and the circumferentially arranged pins 43. It will also be obvious how the juice bearing pulp of the fruit will be gradually forced between the grid bars 116 as the fruit is moved downwardly over the grid sections. By the time the fruit reaches the pulp severing device P, the juice bearing pulp is forced completely into the grid sections, and the revoluble cutters 141 sever the pulp from the pectin bearing material as the fruit moves thereover. Figure 15 illustrates the pulp severing operation being performed upon the fruit as it moves past the revoluble cutters 141. The juice bearing pulp upon being severed, drops into a trough 153, which is secured to the sides 121 and 126 forming the housing for the pulp severing cutters 141. The bottom of the trough 153 is inclined and is provided with an outlet 154 through which the juice bearing pulp is discharged into any suitable receptacle (not shown).

The juice forced from the pulp during the movement of the fruit over the grid sections, is collected by the hopper 129, from which it is discharged through the hopper outlet 130 to any suitable receptacle (not shown). Any juice adhering to the surface of the rear drum 16 due to the initial compressing operation, is thrown into the shield 154 which partially surrounds the rear drum 16. The juice collected by the shield is discharged into the pulp collecting trough 153 through a conduit 155. The lower end of the shield 154 is riveted to the juice collecting hopper 129, and the upper end is supported by members 156 which connect the shield 154 with the bearing caps 102 of the supporting arms 100 and 101 (Figures 1, 4 and 7). The upper ends of the supports 156 are riveted or otherwise secured to the upper edge of the shield 154, and the lower ends of said supports are secured to the bearing caps 102 by the same screws which secure said caps to the ends of the supporting arms 100 and 101.

It is undesirable to contaminate the juice and pulp recovered from the fruit with the inner pectin bearing lining. This is prevented by maintaining the lower end of the grid structure a sufficient distance from the front drum 15 to prevent the pectin bearing lining of the fruit from being forced onto the revoluble cutters 141. The distance between the drum 15 and the grid sections 115 at the pulp severing position should be substantially equal to the combined thickness of the pectin bearing lining and the outer oil bearing rind of the particular grade of fruit being run through the machine.

The combined thickness of the oil bearing rind and the pectin bearing lining varies appreciably for different grades of fruit. In order to insure the proper application of pressure upon the fruit as it passes over the cutters 141, I provide means for adjusting the lower end of the grid structure to and from the surface of the drum 15. This is accomplished by adjustably supporting the lower ends of the arms 100 and 101 upon which the grid structure is mounted. The lower ends of the arms 100 and 101 are supported by link members 159 shown clearest in Figures 1, 2 and 7. The upper ends of the links 159 are pivotally secured to the supporting arms 100 and 101 through bolts 161. The lower ends of said links are provided with a pair of collars 162 by which they are pivotally supported on a rod 163. The rod ends are supported by traveling members 164 and are secured thereto by nuts 165. The traveling members 164 are threaded onto adjusting screws 166 and are movable thereon in response to a rotative movement of said screws. The ends of the adjusting screws 166 are supported by bearings 167 mounted on the inner sides of the supporting pedestals 10 and 11. The rearward ends of the adjusting screws extend through their bearing supports and carry beveled gears 168 which mesh with a corresponding set of beveled gears 169 carried on a rod 170. The ends of the rod 170 are in turn supported by bearings 171 mounted on the rearward edges of the supporting pedestals, and said rod carries a hand wheel 172 on one end by which the adjusting mechanism may be operated. Upon rotating the hand wheel, the adjusting screws 166 are rotated and the traveling members 164 are moved therealong. Obviously, the links 159 will effect a rotative movement of the supporting arms 100 and 101 about the bearing eccentrics 53 to which their upper ends are pivotally connected. It will further be obvious how the grid structure which is mounted on said arms, may be readily adjusted with respect to the surface of the front drum 15. Furthermore, the arms 100 and 101 together with the grid structure and other members supported thereon, may be moved downwardly, completely away from the drum 15 to facilitate the cleaning of the various parts.

After the pulp severing operation has been performed upon the fruit, the rinds of the fruit are moved over the solid extended portions 120 of the grid sections 115 onto a cylinder 173, which rotates in a direction opposed to that of the revoluble drum 15. The pectin bearing lining of the fruit is forced into a series of closely spaced peripheral grooves 174 arranged in parallel relation along the entire length of the cylinder 173. The revoluble drum 15 may be adjusted with respect to the cylinder 173 in a manner heretofore described, for ensuring the proper application of pressure upon the rind as it engages said cylinder. The embedded pectin bearing lining of the fruit together with the outer oil bearing rind, are deflected from engagement with the drum 15 by a blade 175 formed on the oil collecting trough 176, and are rotated with the grooved cylinder. The diagrammatic view Figure 16 shows the pectin bearing lining within the grooves 174 of the cylinder 173, and also shows the oil bearing rind projecting above the outer surface of said cylinder. As the rind portions of the fruit are rotated upon the grooved cylinder 173, they are restrained against removal by the curved bottom 177 of the oil collecting trough 176, shown clearest in Figure 7. The outer oil bearing rind of the fruit is severed from the pectin bearing substance embedded within the grooved cylinder 173, by a reciprocating severing device hereinafter described in detail. Subsequent to the severing operation, the pectin bearing substance is removed from the grooves of the cylinder 173 in a manner also hereinafter fully described.

The grooved cylinder 173 is hollow and is formed with a number of supporting members 178 by which it is mounted on the shaft 180. The supporting members 178 are splined to the shaft 180 by keys 182 (Figure 9), and the cylinder is retained in position by a pair of retaining collars 181. The ends of the shaft 180 are supported in bearing structures 184 and 185, which are mounted on the inner faces of the supporting pedestals 10 and 11 respectively. The bearings 184 and 185 are provided with exterior flanges 186 by which they are secured to the pedestals as by the screws 187. That end of the shaft 180 supported by the bearing structure 185, extends through said bearing into the housing 62 provided in the supporting pedestal 11, and carries the sprocket 188, which is driven in a manner hereinafter described, for effecting the rotation of the grooved cylinder 173.

Some of the oil bearing cells of the outer rind are broken as the fruit is compressed against the grid structure during the course of its travel. However, this oil is sealed between the outer oil bearing rind and the surface of the revoluble drum 15, and is restrained from mixing with the juice and pulp. When the rinds are deflected onto the grooved cylinder 173, the liberated oil adheres to the surface of the drum 15 is carried upwardly by attraction. The oil is removed from the surface of the drum 15 by a yieldable wiper 189 and drops into the oil collecting trough 176. The wiper 189 is held between the clamping strips 190 and 191 as by screws 192, and the clamping member 191 is secured to a series of supports 192' as by the screws 193 (Figures 7 and 9). The supports 192' are threaded into lugs 194 formed on the curved bottom 177 of the oil collecting trough 176. The trough 176 is supported at opposite ends by brackets 195 and 196 formed on the bearing structures 184 and 185 respectively, and is secured to said brackets by screws 197.

The means provided for removing the outer oil bearing rind from the pectin bearing material embedded in the grooved cylinder, comprises a knife consisting of a series of blades 198, which are arranged in axial alignment with respect to the grooved cylinder 173 and which bear thereagainst as shown clearest in Figures 7 and 9. The knife blades 198 are secured to blade supports 199 as by the clamping strips 200, and screws 201, which extend through the clamping strips and are threaded into the supports 199 (Figure 7). The blade supports 199 are formed with split clamping rings 202, which surround a tubular knife support 203, and are clamped thereto by the screws 204. The tubular knife support 203 carries extended end members 205 and 206, which are slidably supported in bearing structures 207 and 208, respectively. The bearing structures 207 and 208 are mounted on the brackets 195 and 196 formed on the bearing 184 and 185 supporting the cylinder shaft 180. Said bearing supports are secured to the supporting brackets by screws 211. The tubular knife support 203 and its extended end members 205 and 206, are restrained against rotation by the guide pins 212 and 213, and the members 214 and 215 which connect said guide pins with the extended members 205 and 206 (Figure 9). The interconnecting members 214 and 215 are formed with split clamping rings by which they are secured to the extended members 205 and 206, and the guide pins are slidably supported by the bearing supports 207 and 208.

The severing operation of the oil bearing rind is facilitated by reciprocating the knife blades 198 in an axial direction with respect to the grooved cylinder 173. The means employed for effecting this reciprocative movement of the blades 198 is best shown in Figures 2, 3, 6, and 9. The end of the shaft 180 supported by the bearing structure 184, extends through said bearing structure into a housing 218 formed on the supporting pedestal 10. It carries a pair of spaced cam members 219 and 220, which provide adjacent cam faces 222. The front of the housing 218 is provided with an opening 225 over which a bearing box 226 is mounted as by the screws 227. Bearings 228 and 229 are provided on opposite sides of the bearing box. The corresponding bearings on each side are arranged in alignment and accommodate rods 230 and 231 which are slidably supported therein. A member 232 connects the innermost ends of the sliding rods 230 and 231 with the outermost end of the member 205 extending from the tubular knife support 203, all of which is shown clearly in Figures 2, 4 and 9.

The sliding rods 230 and 231 are interconnected with the revoluble cylinder shaft 180 through the frictional engagement of the cam faces 222 with a frustro-conical roller 235 carried by a member 236, which bridges the rods 230 and 231 as shown clearest in Figure 6. The connecting member 236 is secured to the sliding rods by set screws 238 and carries a spindle 239 upon which the frustro-conical roller 235 is revolubly mounted. The cam faces 222 are of such form that their rotative engagement with the conical roller 235 imparts to said roller a reciprocative motion. Obviously, said reciprocative motion is transmitted to the severing blades 198 through the various interconnections heretofore described. It will further be obvious how a reciprocation of said blades facilitates in the removal of the oil bearing rind from the pectin bearing lining contained within the grooved cylinder 173. The diagrammatic view Figure 17 shows the pectin bearing material embedded in the grooved cylinder 173 and the outer oil bearing rind in the process of being removed by the reciprocative severing blades heretofore described.

After the outer oil bearing rind has been removed, the pectin bearing material is removed from the grooves 174 of the cylinder 173 by a series of combs 246, the teeth of which extend into the grooves 174 of the revoluble cylinder 173 as shown clearest in Figures 2 and 7. The combs 246 are mounted on a supporting bar 248 by screws 249, and said supporting bar 248 is secured at opposite ends to the bearing brackets 195 and 196 as by screws 250 (Figure 2). The diagrammatic view Figure 18 illustrates the pectin bearing substance in the process of being removed from the grooved cylinder 173 by the combs 246.

Both the pectin bearing lining and the oil bearing rind may be discharged onto any suitable conveying device and carried from the machine for further treatment. A device in the form of a conveyer belt 251 is shown in Figure 1 for accomplishing this purpose. The pectin bearing substance drops onto the inner side of the belt and the oil bearing rind drops onto the outer side, there being a central partition 252 for preventing the two products from mixing as they are conveyed away from the machine.

A variable speed driving motor M is contained within a housing 253 provided between the supporting pedestals 10 and 11, Figure 3. The motor shaft 254 extends into the housing 62 provided in the supporting pedestal 11 and carries a driving sprocket 255. The sprockets 63 and 96 carried by the drum shafts, together with the sprocket 188 carried by the grooved cylinder 173, are all contained within the housing 62. These sprockets are all interconnected with the driving sprocket 255 on the motor shaft through an endless chain 256. The chain is driven in a direction indicated by the arrows in Figure 3, and passes from the driving sprocket 255 upwardly over a small idler sprocket 257 and around the rear drum sprocket 63. It passes from the rear drum sprocket 63 over another small idler sprocket 258, and downwardly beneath the sprocket 188 of the grooved cylinder shaft 180. From the sprocket 188 the chain passes over the top of the front drum sprocket 96 and extends downwardly and around the driving sprocket 255. The rear drum sprocket 63 is somewhat smaller than the front drum sprocket 96, and the rear drum 16 is accordingly driven somewhat faster than the front drum 15. The purpose of this differential speed is to force the forward edges of the fruit downwardly as it enters between the drums, so that it will be moved onto the grid structure with its severed surfaces facing the same, all of which has heretofore been described.

The shaft 20 for supporting the rotary fruit severing knives 14, is driven from the rear drum shaft 46 through a chain and sprocket drive which has heretofore been described in detail. The speed of the apparatus may be varied by the hand wheel 259 of the variable speed driving unit M. Figure 1 shows the hand wheel, which is conveniently located adjacent the outer face of the supporting pedestal 10.

The modified form of my invention shown in Figure 8 is primarily for recovering the juice from citrus fruit. It comprises a pair of rotary drums 260 and 261, between which the fruit is fed onto a perforated plate 262. The contact of the front drum 260 with the oil bearing rind serves to convey the fruit over the perforated plate 262, the severed surfaces of the fruit being positioned adjacent said plate. The perforated plate 262 is curved and converges toward the drum 260 for gradually effecting a compressing action upon the fruit during its downward movement. Said plate is mounted upon a supporting structure 263 similar to the grid structure provided in the form of the invention heretofore described.

The supporting structure may be mounted between a pair of adjustable arms similar to those shown in the form already described, so as to permit the adjustment of the perforated plate 262 with respect to the front drum 260. The upper end of the supporting structure is provided at opposite sides with yoke members 264 which are supported by lugs 265 extending inwardly from the adjustable supporting arms. The lower end of the structure 263 is supported on the juice collecting hopper 266, which is also mounted between the adjustable supporting arms.

As the fruit is conveyed downwardly over the perforated plate 262 it is gradually compressed. The juice is forced through the perforations of the plate 262 and drops into the hopper 266, from which it is discharged through the hopper outlet 267 to any suitable receptacle (not shown). The upper end of the perforated plate 262 may be adjusted with respect to the drum 260 through eccentric members 278.

Figures 19 and 20 illustrate still another form of the invention. In this form the fruit is conveyed over a horizontally disposed grid structure 268 by the engagement of an endless belt 269 with the oil bearing rind of the fruit. Said belt may be provided with a roughened surface or a series of small projecting points for facilitating the movement of the fruit over the grid structure. The belt passes around a pair of revoluble drums 270 and 271, a portion of which is disposed in spaced convergent relation with respect to the grid structure 268. The fruit is fed past one or more rotary knives 273, which sever the fruit into halves. The halves are directed between the endless belt 269 and a member 274, so that the oil bearing rind of the fruit is engaged by the belt and carried downwardly onto the grid structure 268. The grid structure comprises a series of bars 275 arranged in spaced parallel relation longitudinally of the belt 269. The belt passes beneath a series of rollers 276, and as the fruit is conveyed along the grid structure it is gradually compressed thereagainst and the pulp is forced between the spaced bars 275 as shown in Figure 20. The compressed fruit is moved over a series of rotary cutters 277, which enter the spaces between the grid bars 275 and sever the pulp from the rind. The pulp drops into a trough 278, which also receives the juice forced from the fruit during its movement over the grid structure 268.

I claim:

1. The method of treating citrus fruit comprising, severing the fruit into sections, arranging the sections so that the pulp portion of each of the sections faces in the same direction relative to the rind, simultaneously applying pressure to the inner and outer rind surfaces thereby flattening said rind while maintaining the juice-bearing pulp in substantially uncompressed condition and adhering to the rind, severing the pulp from the rind while said rind is in flattened condition and while the outer surface thereof is under pressure substantially throughout its area, and maintaining said rinds in flattened condition under pressure while effecting a separation between the inner and outer rind constituents.

2. The method of treating citrus fruit comprising, severing the fruit into sections, arranging the sections so that the pulp portion of each of the sections faces in the same direction, simultaneously applying pressure to the inner and outer rind surfaces thereby flattening said rind and breaking oil cells in said outer rind while substantially confining oil within the area of the rind under pressure and while maintaining the juice bearing pulp in substantially uncompressed condition adhering to the rind, severing the pulp from the rind while said rind is in flattened condition and while the outer surface thereof is under pressure substantially throughout its area, withdrawing the pressure from the outer rind exposing the released oils, and collecting said rind oils.

3. The process of treating sectional citrus fruit possessing arcuate rind and normal adhering pulp portions, which comprises subjecting the rind portions to pressure throughout the area thereof to transform the arcuate rind portion into a flattened condition dispersing the pulpy mass leaving the same substantially in unflattened condition and adhering to the rind while substantially confining oil in said rind against escape from the area of the rind under pressure, separating the pulp from the rind, withdrawing the pressure on the rind exposing the liberated rind oils, and finally collecting said oils.

4. A machine for treating citrus fruit including a pair of opposed members defining a converging space for the passage of sectional fruit to effect a gradual deformation thereof, one of said members providing a plurality of spaces in communication with said passage in the region of its narrow end, the opposing surfaces of said members being so spaced in said region as to maintain substantially the entire rind under pressure and in substantially flattened condition with substantially all the pulpy portion projecting into said spaces and adhering to the rind, means in said spaces for removing the adhering pulpy portion from the rind, means for maintaining the rind in flattened and compressed condition subsequent to removal of said pulp, and means for effecting separation between the inner and outer portions of the rind.

5. A machine for treating citrus fruit including a pair of opposed members defining a converging space for the passage of sectional fruit to effect a gradual deformation thereof, one of said members providing a plurality of spaces in communication with said passage in the region of its narrow end, the opposing surfaces of said members being so spaced in said region as to maintain substantially the entire rind under pressure and in substantially flattened condition with substantially all the pulpy portion projecting into said spaces and adhering to the rind, means for effecting separation between the pulp and rind in said region, means for maintaining the rind in flattened and compressed condition subsequent to its separation from the pulp, means providing spaces for the reception of the inner portion of the rind, said means being cooperative with one of said members for forcing said rind portion into said spaces, and means for effecting separation between the rind portion within said spaces and the rind portion exteriorly of said spaces.

6. A machine for separating constituents of fruit, comprising a revoluble pressure member, a member defining a convergent passage with said pressure member for deforming cut fruit therebetween, means including a second revoluble member adjacent said first-mentioned pressure member in the vicinity of the inlet end of said convergent passage, said revoluble members being spaced apart to receive and simultaneously engage said fruit to positively direct it toward the inlet end of said passage, means for rotating said revoluble members at different peripheral speeds to ensure proper positioning of the fruit as it enters said passage, and means for adjusting the space between said revoluble pressure members whereby to permit reception of fruits of various sizes therebetween, the second revoluble member being provided with means for slitting the leading edges of the fruit prior to its entrance into said convergent passage.

7. A machine for separating constituents of fruit, comprising a rotatable pressure drum, a second pressure member defining a convergent passage with said drum for deforming cut fruit therebetween, a second rotatable drum adjacent said pressure drum in the vicinity of the inlet end of said convergent passage, said drums being spaced apart to receive and simultaneously engage said fruit, means on said second rotatable drum adapted to slit the leading edges of the fruit to condition it for entrance into said convergent passage, and means for rotating said second drum at a faster peripheral speed than said pressure drum to obtain said slitting and to ensure proper positioning of the fruit as it enters said passage.

8. A machine for separating constituents of fruit, comprising a rotatable pressure drum, a second pressure member defining a convergent passage with said drum for deforming cut fruit therebetween, a second rotatable drum adjacent said pressure drum in the vicinity of the inlet end of said convergent passage, said drums being spaced apart to receive and simultaneously engage said fruit, means on said second rotatable drum adapted to slit the leading edges of the fruit to condition it for entrance into said convergent passage, means for rotating said second drum at a faster peripheral speed than said pressure drum to obtain said slitting and to ensure proper positioning of the fruit as it enters said passage, means cooperable with said pressure drum for effecting separation between the pulp and rind portions of said fruit, and means for supporting said last-mentioned means for movement about the axis of said second rotatable drum to adjust the position of said means with respect to said pressure drum.

9. The process of treating cut citrus fruits, which comprises gradually flattening the fruit by pressure between the rind and outer face, a substantial portion of the juice being removed during said gradual flattening, then removing the juice-bearing pulp while the fruit is in its flattened condition under pressure, maintaining said fruit in said flattened and compressed condition after removal of said pulp, and then effecting separation between the inner and outer rind portions of the fruit.

10. In apparatus of the character described, means for gradually flattening cut citrus fruits and during such flattening extracting a substantial portion of the juice, means for removing the pulp from the fruits while in flattened condition, means for maintaining said fruit in said flattened and compressed condition after removal of the pulp, and means for subsequently effecting separation between the inner and outer rind portions while the fruit is maintained in flattened condition.

11. In an apparatus for treating cut citrus fruits, means for simultaneously flattening said fruits gradually against the cut surface and for moving the fruit, a substantial portion of the juice being removed during the flattening movement, a pulp-removing means operating on the fruit during movement of the fruit, means for maintaining said fruit in said flattened condition after removal of the pulp, and means for subsequently effecting separation between the inner and outer rind portions while maintaining said fruit in continued flattened condition.

12. The process of treating citrus fruits, which consists in initially moving a substantially half section of fruit into a gradually converging passage and during such movement slitting edge portions only of the rind to condition said sections to assume and maintain a predetermined position throughout a treating zone and beginning with entrance of the sections into the passage and during its travel therethrough extracting a substantial portion of the juice through one side of said passge while gradually flattening the rind by pressure leaving the pulp in substantially uncompressed condition, and next removing the pulp from the rind through the same side of the passage that the juice is extracted while the rind is still in a flattened condition under pressure.

13. The process of treating citrus fruits, which consists in moving a substantially half-section of fruit into a gradually converging passage engaging the cut side of the fruit at spaced points only during its travel through said passage and beginning with entrance thereinto and during its travel therethrough extracting a substantial portion of the juice through one side of said passage while gradually flattening the rind by pressure leaving the pulp in substantially uncompressed condition, and next removing the pulp from the rind through the same side of the passage that the juice is extracted while the rind is still in a flattened condition under pressure.

14. The process of treating citrus fruits, which consists in moving a substantially half section of fruit into a gradually converging passage and beginning with entrance thereinto and during its travel therethrough extracting a substantial portion of the juice while gradually flattening the rind by pressure leaving the pulp in substantially uncompressed condition, next removing the pulp from the rind while the rind is still in a flattened condition under pressure, and finally separating the inner and outer rind portions while still under pressure.

15. The process of treating citrus fruits, which consists in moving a substantially half-section of fruit into a gradually converging passage and beginning with its entrance thereinto and during its travel therethrough extracting a substantial portion of the juice while gradually flattening the rind by pressure and breaking the oil cells leaving the pulp in substantially uncompressed condition, oil being maintained in the cells due to the pressure and flattened condition of the rind, then removing the pulp from the rind while the rind is still in its flattened condition under pressure, and then releasing the pressure to release the rind oils from the cells.

16. The process of treating citrus fruits, which consists in moving a substantially half-section of fruit into a gradualy converging passage and beginning with entrance thereinto and during its travel therethrough extracting a substantial portion of the juice while gradualy flattening the rind by pressure and breaking the oil cells leaving the pulp in substantially uncompressed condition, oil being maintained in the cells due to the pressure and flattened condition of the rind, then removing the pulp from the rind while the rind is still in its flattened condition under pressure, then releasing the pressure to release the rind oils from the cells, and finally separating the inner and outer rind portions.

17. A machine of the character described for treating cut citrus fruit including a gradually converging passage of substantial length adapted for the purpose of extracting juice, means for moving a section of the fruit into and through the passage and beginning with its entrance thereinto and during its travel therethrough extracting a substantial portion of the juice, said moving means constituting one face of the passage, the opposite face of the passage including a grid positioned to cooperate with the moving means for flattening the rind by pressure between the grid and moving means leaving the pulp in substantially uncompressed condition, and means adjacent the discharge end of the grid for removing the pulp from the rind while the rind is still in its flattened condition under pressure.

18. A machine of the character described for treating cut citrus fruit including a gradually converging passage of substantial length adapted for the purpose of extracting juice, means for moving a section of the fruit into and through the passage and beginning with its entrance thereinto and during its travel therethrough extracting a substantial portion of the juice, said moving means constituting one face of the passage, the opposite face of the passage including a grid positioned to cooperate with the moving means for flattening the rind by pressure between the grid and moving means leaving the pulp in substantially uncompressed condition, means for removing the pulp from the rind while the rind is still in its flattened condition under pressure, and means for separating the inner and outer rind portions while still under pressure.

19. A machine of the character described for treating cut citrus fruit including a gradually converging passage of substantial length adapted for the purpose of extracting juice, means for moving a section of fruit into and through the passage and beginning with entrance thereinto and during its travel therethrough extracting a substantial portion of the juice, said moving means constituting one face of the passage, the opposite face of the passage including a grid positioned to cooperate with the moving means for flattening the rind by pressure between the grid and moving means and breaking the oil cells of the rind leaving the pulp in substantially uncompressed condition, oil being maintained in the cells due to the pressure and flattened condition of the rind, means for removing the pulp from the rind while the rind is still in its flattened condition under pressure, and means for relieving the pressure to release the rind oils from the cells.

20. A machine of the character described for treating cut citrus fruit including a gradually converging passage of substantial length adapted for the purpose of extracting juice, means for moving a section of fruit into and through the passage and beginning with entrance thereinto and during its travel therethrough extracting a substantial portion of the juice, said moving means constituting one face of the passage, the opposite face of the passage including a grid positioned to cooperate with the moving means for flattening the rind by pressure between the grid and moving means and breaking the oil cells of the rind leaving the pulp in substantially uncompressed condition, oil being maintained in the cells due to the pressure and flattened condition of the rind, means for removing the pulp from the rind while the rind is still in its flattened condition under pressure, means for relieving the pressure to release rind oils from the cells, and means for separating the inner and outer rind portions.

LAWRENCE A. FRY.